United States Patent
Schmitz et al.

(10) Patent No.: US 11,124,093 B2
(45) Date of Patent: Sep. 21, 2021

(54) RECLINER MECHANISM FOR SEAT ASSEMBLY AND METHOD OF MANUFACTURING

(71) Applicant: FISHER & COMPANY, INCORPORATED, St. Clair Shores, MI (US)

(72) Inventors: Ralph L. Schmitz, Clinton Township, MI (US); Sapan M. Poptani, Northville, MI (US); Barnabas Bancsov, Clinton Township, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 22 days.

(21) Appl. No.: 16/524,325

(22) Filed: Jul. 29, 2019

(65) Prior Publication Data
US 2020/0047644 A1    Feb. 13, 2020

Related U.S. Application Data (60) Provisional application No. 62/715,960, filed on Aug. 8, 2018.

(51) Int. Cl.
*B60N 2/20*    (2006.01)
*B60N 2/235*    (2006.01)

(52) U.S. Cl.
CPC .............. *B60N 2/20* (2013.01); *B60N 2/2362* (2015.04)

(58) Field of Classification Search
None
See application file for complete search history.

(56) References Cited

U.S. PATENT DOCUMENTS

| 3,736,026 A | 5/1973 | Ziegler et al. |
|---|---|---|
| 3,953,069 A | 4/1976 | Tamura et al. |
| 4,219,234 A | 8/1980 | Bell |
| 4,243,264 A | 1/1981 | Bell |

(Continued)

FOREIGN PATENT DOCUMENTS

| CA | 2869816 A1 | 10/2013 |
|---|---|---|
| CN | 1291566 A | 4/2001 |

(Continued)

OTHER PUBLICATIONS

Office Action regarding German Patent Application No. 102016114406. 1, dated Apr. 27, 2020. Translation provided by Witte, Weller & Partner Patentanwälte mbB.

(Continued)

*Primary Examiner* — David E Allred
(74) *Attorney, Agent, or Firm* — Harness, Dickey & Pierce, P.L.C.

(57) ABSTRACT

A method for manufacturing a recliner heart may include supporting a guide plate of the recliner heart with a first support member, positioning a first block onto the guide plate opposite the first support member, positioning a second block in a recess of the guide plate, and applying a force to the first block. The second block may be disposed in the recess such that a gap is formed between the guide plate and the second block. A force may be applied to the first block such that material of the guide plate moves into the gap formed between the guide plate and the second block.

7 Claims, 7 Drawing Sheets

(56) References Cited

U.S. PATENT DOCUMENTS

| | | |
|---|---|---|
| 4,279,442 A | 7/1981 | Bell |
| 4,372,610 A | 2/1983 | Fisher, III et al. |
| 4,457,557 A | 7/1984 | Une |
| 4,484,779 A | 11/1984 | Suzuki |
| 4,579,387 A | 4/1986 | Bell |
| 4,634,182 A | 1/1987 | Tanaka |
| 4,684,174 A | 8/1987 | Bell |
| 4,705,319 A | 11/1987 | Bell |
| 4,720,145 A | 1/1988 | Bell |
| 4,733,912 A | 3/1988 | Secord |
| 4,747,641 A | 5/1988 | Bell |
| 4,795,213 A | 1/1989 | Bell |
| 4,822,100 A | 4/1989 | Bell |
| 4,919,482 A | 4/1990 | Landis et al. |
| 4,928,374 A | 5/1990 | Allen |
| 5,007,680 A | 4/1991 | Miyauchi et al. |
| 5,044,647 A | 9/1991 | Patterson |
| 5,154,476 A | 10/1992 | Haider et al. |
| 5,240,309 A | 8/1993 | Kojer |
| 5,248,184 A | 9/1993 | Morris |
| 5,265,937 A | 11/1993 | Allen |
| 5,393,116 A | 2/1995 | Bolsworth et al. |
| 5,419,616 A | 5/1995 | Paetzold |
| 5,435,624 A | 7/1995 | Bray et al. |
| 5,460,429 A | 10/1995 | Whalen |
| 5,489,141 A | 2/1996 | Strausbaugh et al. |
| 5,577,805 A | 11/1996 | Glinter et al. |
| 5,590,932 A | 1/1997 | Olivieri |
| 5,622,410 A | 4/1997 | Robinson |
| 5,628,215 A | 5/1997 | Brown |
| 5,660,440 A | 8/1997 | Pejathaya |
| 5,718,481 A | 2/1998 | Robinson |
| 5,769,493 A | 6/1998 | Pejathaya |
| 5,788,330 A | 8/1998 | Ryan |
| 5,823,622 A | 10/1998 | Fisher, IV et al. |
| 5,857,659 A * | 1/1999 | Kato ............... B60G 7/001 24/20 CW |
| 5,918,939 A | 7/1999 | Magadanz |
| 5,927,809 A | 7/1999 | Tame |
| 5,941,591 A | 8/1999 | Tsuge et al. |
| 5,947,560 A | 9/1999 | Chen |
| 5,979,986 A | 11/1999 | Pejathaya |
| 6,007,152 A | 12/1999 | Kojima et al. |
| 6,023,994 A | 2/2000 | Yoshida |
| 6,047,444 A | 4/2000 | Braun |
| 6,068,341 A | 5/2000 | Rink |
| 6,074,009 A | 6/2000 | Farino |
| 6,095,609 A | 8/2000 | Magadanz |
| 6,106,067 A | 8/2000 | Zhuang et al. |
| 6,123,380 A | 9/2000 | Sturt et al. |
| 6,139,104 A | 10/2000 | Brewer |
| 6,158,800 A | 12/2000 | Tsuge et al. |
| 6,161,899 A | 12/2000 | Yu |
| 6,199,953 B1 | 3/2001 | Chen |
| 6,250,704 B1 | 6/2001 | Garrido |
| 6,290,297 B1 | 9/2001 | Yu |
| 6,328,381 B1 | 12/2001 | Smuk |
| 6,345,867 B1 | 2/2002 | Hellrung et al. |
| 6,447,066 B1 | 9/2002 | Chabanne et al. |
| 6,511,129 B1 | 1/2003 | Minor et al. |
| 6,533,357 B2 | 3/2003 | Pospeshil et al. |
| 6,550,864 B1 | 4/2003 | Zarna et al. |
| 6,554,362 B1 | 4/2003 | Pospeshil |
| 6,634,713 B2 | 10/2003 | Nonomiya et al. |
| 6,669,296 B2 | 12/2003 | Moriyama et al. |
| 6,669,299 B2 | 12/2003 | Carlson et al. |
| 6,698,837 B2 | 3/2004 | Pejathaya et al. |
| 6,740,845 B2 | 5/2004 | Stol et al. |
| 6,854,802 B2 | 2/2005 | Matsuura et al. |
| 6,857,703 B2 | 2/2005 | Bonk |
| 6,860,562 B2 | 3/2005 | Bonk |
| 6,869,143 B2 | 3/2005 | Secord |
| 6,908,156 B1 | 6/2005 | Park et al. |
| 7,025,422 B2 | 4/2006 | Fast |
| 7,093,901 B2 | 8/2006 | Yamada |
| 7,097,253 B2 | 8/2006 | Coughlin et al. |
| 7,100,987 B2 | 9/2006 | Volker et al. |
| 7,121,624 B2 | 10/2006 | Pejathaya et al. |
| 7,152,924 B1 | 12/2006 | Nemoto et al. |
| 7,154,065 B2 | 12/2006 | Martukanitz et al. |
| 7,172,253 B2 | 2/2007 | Haverkamp |
| 7,198,330 B2 | 4/2007 | Wahlen et al. |
| 7,293,838 B2 | 11/2007 | Sugama et al. |
| 7,296,857 B2 | 11/2007 | Shinozaki et al. |
| 7,300,109 B2 | 11/2007 | Hofmann et al. |
| 7,306,286 B2 | 12/2007 | Syrowik et al. |
| 7,328,954 B2 | 2/2008 | Sasaki et al. |
| 7,360,838 B2 | 4/2008 | Smuk |
| 7,419,217 B2 | 9/2008 | Ishizuka |
| 7,458,639 B2 | 12/2008 | Thiel et al. |
| 7,490,907 B2 | 2/2009 | Nagura et al. |
| 7,503,099 B2 | 3/2009 | Pejathaya |
| 7,527,336 B2 | 5/2009 | Kienke et al. |
| 7,578,556 B2 | 8/2009 | Ohba et al. |
| 7,604,297 B2 | 10/2009 | Weber |
| 7,695,068 B2 | 4/2010 | Maeda et al. |
| 7,775,591 B2 | 8/2010 | Hahn et al. |
| 7,976,103 B2 | 7/2011 | Gamache et al. |
| 8,052,215 B2 | 11/2011 | Ito |
| 8,360,527 B2 | 1/2013 | Lehmann |
| 9,102,248 B2 | 8/2015 | Matt |
| 9,108,541 B2 | 8/2015 | Assmann et al. |
| 9,227,532 B2 | 1/2016 | Balzar et al. |
| 9,527,410 B2 | 12/2016 | Leconte |
| 9,527,419 B2 | 12/2016 | Hosbach et al. |
| 9,555,725 B2 | 1/2017 | Rothstein et al. |
| 9,701,222 B2 | 7/2017 | Kitou |
| 9,751,432 B2 | 9/2017 | Assmann |
| 9,873,357 B1 | 1/2018 | McCulloch et al. |
| 9,889,774 B2 | 2/2018 | Espinosa et al. |
| 10,279,709 B2 | 5/2019 | Suzuki et al. |
| 10,610,018 B1 | 4/2020 | Madhu |
| 10,800,296 B2 | 10/2020 | Schmitz et al. |
| 10,864,830 B2 | 12/2020 | Schmitz et al. |
| 2003/0127898 A1 | 7/2003 | Niimi et al. |
| 2003/0230923 A1 | 12/2003 | Uramichi |
| 2004/0134055 A1* | 7/2004 | Aizaki ............... B21K 25/00 29/407.05 |
| 2005/0029806 A1* | 2/2005 | Yamanashi ........... F16L 41/086 285/124.1 |
| 2005/0253439 A1 | 11/2005 | Sasaki et al. |
| 2006/0006718 A1 | 1/2006 | Umezaki |
| 2006/0012232 A1 | 1/2006 | Coughlin et al. |
| 2006/0055223 A1 | 3/2006 | Thiel et al. |
| 2006/0170269 A1 | 8/2006 | Oki |
| 2007/0138854 A1 | 6/2007 | Paing et al. |
| 2007/0200408 A1 | 8/2007 | Ohta et al. |
| 2008/0001458 A1 | 1/2008 | Hoshihara et al. |
| 2008/0164741 A1 | 7/2008 | Sakamoto |
| 2009/0056124 A1 | 3/2009 | Krebs et al. |
| 2009/0072602 A1 | 3/2009 | Schuler |
| 2010/0072802 A1 | 3/2010 | Smith et al. |
| 2010/0096896 A1 | 4/2010 | Nonomiya |
| 2010/0231021 A1 | 9/2010 | Myers et al. |
| 2010/0320823 A1 | 12/2010 | Thiel |
| 2011/0068612 A1 | 3/2011 | Thiel |
| 2011/0127814 A1 | 6/2011 | Thiel |
| 2011/0227386 A1 | 9/2011 | Berndtson et al. |
| 2012/0248841 A1 | 10/2012 | Hellrung et al. |
| 2013/0207434 A1 | 8/2013 | Stilleke et al. |
| 2013/0270884 A1 | 10/2013 | Espinosa et al. |
| 2014/0091607 A1* | 4/2014 | Maeda ............... A47C 1/024 297/354.12 |
| 2014/0138998 A1 | 5/2014 | Christoffel et al. |
| 2014/0159458 A1* | 6/2014 | Lu ............... B60N 2/2356 297/366 |
| 2014/0301682 A1 | 10/2014 | Leppla |
| 2015/0015044 A1 | 1/2015 | Teufel et al. |
| 2015/0069809 A1 | 3/2015 | Matt |
| 2015/0091354 A1 | 4/2015 | Enokijima et al. |
| 2015/0123444 A1 | 5/2015 | Assmann |
| 2015/0266398 A1 | 9/2015 | Higashi et al. |
| 2015/0306986 A1 | 10/2015 | Jarry et al. |
| 2015/0321585 A1 | 11/2015 | McCulloch et al. |

(56) References Cited

U.S. PATENT DOCUMENTS

| | | |
|---|---|---|
| 2016/0339810 A1 | 11/2016 | Pluta et al. |
| 2017/0037945 A1 | 2/2017 | Maeda et al. |
| 2017/0080828 A1 | 3/2017 | Aktas |
| 2017/0088021 A1 | 3/2017 | Noguchi et al. |
| 2017/0136921 A1 | 5/2017 | Dill et al. |
| 2018/0056819 A1 | 3/2018 | Schmitz et al. |
| 2018/0103760 A1 | 4/2018 | Fujita et al. |
| 2019/0255979 A1 | 8/2019 | Zahn et al. |
| 2019/0329674 A1 | 10/2019 | Schmitz et al. |
| 2019/0337424 A1 | 11/2019 | Chang |
| 2019/0358694 A1* | 11/2019 | Yamakita ............... B60N 2/236 |
| 2020/0070689 A1 | 3/2020 | Naik et al. |
| 2020/0253380 A1 | 8/2020 | Schmitz et al. |
| 2020/0282879 A1 | 9/2020 | Schmitz et al. |
| 2020/0331367 A1 | 10/2020 | Schmitz et al. |
| 2021/0039528 A1 | 2/2021 | Poptani et al. |
| 2021/0061139 A1 | 3/2021 | Schmitz et al. |

FOREIGN PATENT DOCUMENTS

| | | |
|---|---|---|
| CN | 1457306 A | 11/2003 |
| CN | 1840382 A | 10/2006 |
| CN | 101616820 A | 12/2009 |
| CN | 202086037 U | 12/2011 |
| CN | 103025568 A | 4/2013 |
| DE | 4324734 A1 | 1/1995 |
| DE | 102007002366 B3 | 7/2008 |
| DE | 102008026176 A1 | 12/2009 |
| DE | 102011108976 A1 | 1/2013 |
| DE | 102012008940 A1 | 11/2013 |
| EP | 1074426 A2 | 2/2001 |
| GB | 1546104 A | 5/1979 |
| JP | 2000084684 A | 3/2000 |
| JP | 5290789 B2 | 9/2013 |
| JP | 5555969 B2 | 7/2014 |
| KR | 100601809 B1 | 7/2006 |
| KR | 100817000 B1 | 3/2008 |
| KR | 20090035633 A | 4/2009 |
| KR | 20140001651 A | 1/2014 |
| KR | 101420164 B1 | 7/2014 |
| KR | 101655777 B1 | 9/2016 |
| WO | WO-9620848 A1 | 7/1996 |
| WO | WO-2011069107 A2 | 6/2011 |
| WO | WO-2013167240 A1 | 11/2013 |

OTHER PUBLICATIONS

International Search Report regarding International Application No. PCT/US2020/021377, dated Jun. 30, 2020.
Written Opinion of the International Searching Authority regarding International Application No. PCT/US2020/021377, dated Jun. 30, 2020.
U.S. Appl. No. 16/740,874, filed Jan. 13, 2020, Ralph L. Schmitz et al.
U.S. Appl. No. 16/811,112, filed Mar. 6, 2020, Ralph L. Schmitz et al.
U.S. Appl. No. 16/842,135, filed Apr. 7, 2020, Ralph L. Schmitz et al.
U.S. Appl. No. 16/378,950, filed Apr. 9, 2019, Ralph L. Schmitz et al.
U.S. Appl. No. 16/542,369, filed Aug. 16, 2019, Firoz Divan Naik et al.
Office Action regarding Canadian Patent Application No. 2,812,408, dated Jun. 17, 2016.
Office Action regarding Chinese Patent Application No. 201910334168.9, dated Apr. 30, 2021. Translation provided by Unitalen Attorneys at Law.
Office Action regarding Indian Patent Application No. 201921032346, dated Mar. 18, 2021.
SPI Lasers UK Ltd., "Opening new possibilities with single mode oscillation welding (CW)." Presented at: Laser World of Photonics China; Shanghai, China (Mar. 2008).
Office Action regarding German Patent Application No. 102019211855.0, dated Feb. 4, 2021. Partial translation provided by Bardehle Pagenberg Partnerschaft mbB.
Office Action regarding German Patent Application No. 102019212517.4, dated Mar. 11, 2021. Partial translation provided by Bardehle Pagenberg Partnerschaft mbB.

* cited by examiner

Fig. 8

RECLINER MECHANISM FOR SEAT ASSEMBLY AND METHOD OF MANUFACTURING

CROSS-REFERENCE TO RELATED APPLICATIONS

This application claims the benefit of U.S. Provisional Application No. 62/715,960, filed on Aug. 8, 2018. The entire disclosure of the above application is incorporated herein by reference.

FIELD

The present disclosure relates to a recliner mechanism for a seat assembly and a method of manufacturing the recliner mechanism.

BACKGROUND

This section provides background information related to the present disclosure and is not necessarily prior art.

Vehicle seats often include a recliner heart that can rotate a seatback relative to a seat bottom. A hand lever can be rotated to move the recliner heart between a locked position preventing relative rotation between the seatback and the seat bottom and an unlocked position permitting relative rotation between the seatback and the seat bottom. When in the locked position, tolerances between components of the recliner heart may continue to allow for movement of the seatback relative to the seat bottom, which affects the perceived quality of the seat by a user, for example. The present disclosure provides a recliner heart and a method for reducing tolerances between components of the recliner heart, therefore, restricting movement of the seatback relative to the seat bottom when the recliner heart is in the locked position.

SUMMARY

This section provides a general summary of the disclosure, and is not a comprehensive disclosure of its full scope or all of its features.

In one form, the present disclosure provides a method for manufacturing a recliner heart. The method may include supporting a guide plate of the recliner heart with a first support member, disposing a first block onto the guide plate opposite the first support member, disposing a second block in a recess of the guide plate, and applying a force to the first block. The second block is disposed in the recess such that a gap is formed between the guide plate and the second block. A force is applied to the first block such that material of the guide plate moves into the gap formed between the guide plate and the second block.

In some configurations, the guide plate includes a first boss. The first boss is supported by the first support member and the first block is disposed onto the first boss.

In some configurations, the gap is formed between the first boss of the guide plate and the second block.

In some configurations, the force is applied to the first block via a press.

In some configurations, the method includes disposing a third block onto a second boss of the guide plate.

In some configurations, the method includes supporting the second boss opposite the third block with a second support member.

In some configurations, the second block is disposed between the first and third blocks.

In some configurations, the method includes applying a force to the third block such that material of the second boss moves into another gap formed by the second boss and the second block.

In some configurations, the recess has a first width before the forces are applied to the first and third blocks and a second width after the forces are applied to the first and third blocks. The first width is wider than the second width.

In some configurations, the force is applied to the third block via a second press.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
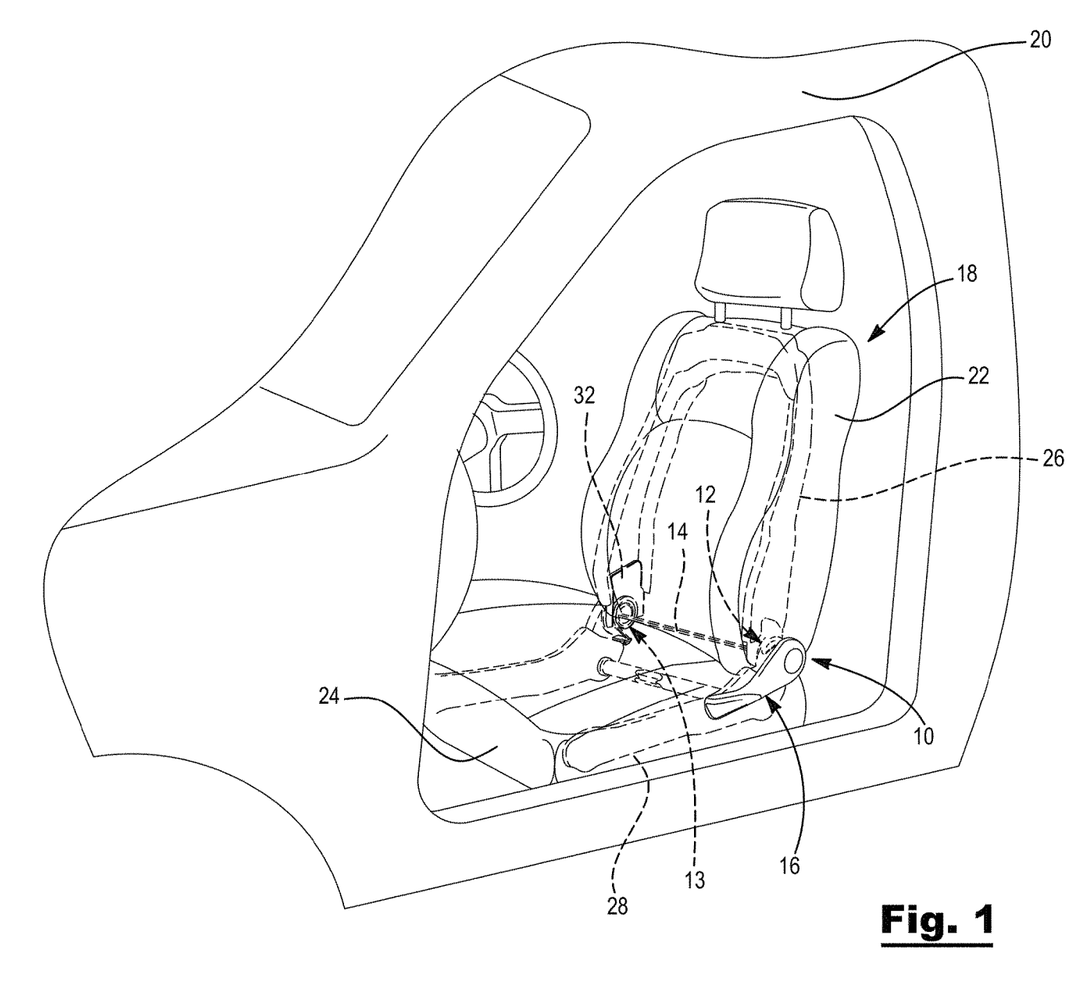
FIG. 1 is a partial perspective view of a vehicle having a seat incorporating a recliner assembly according to the principles of the present disclosure.
Figure 2:
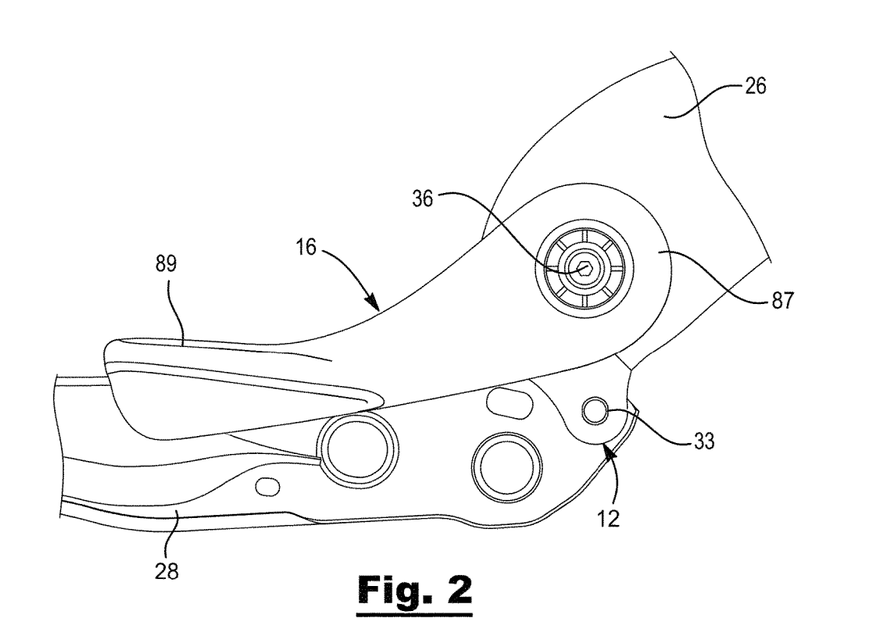
FIG. 2 is a side view of the recliner assembly of FIG. 1 with the seat in a reclined position.
Figure 3:
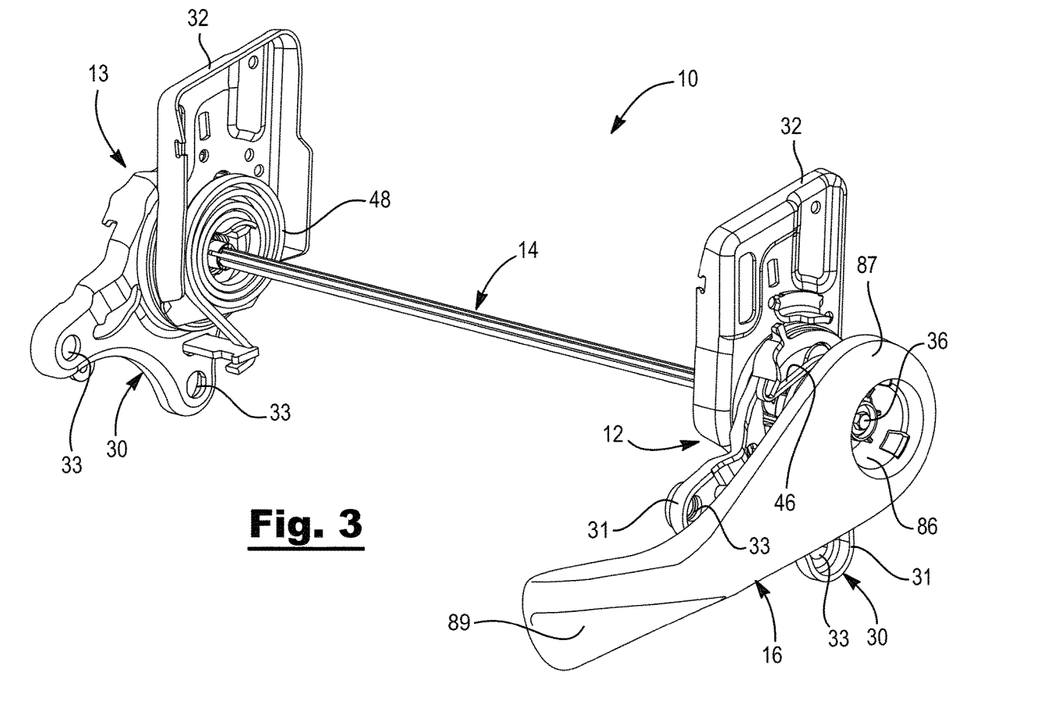
FIG. 3 is a perspective view of the recliner assembly of FIG. 1.

With reference to FIGS. 1-3, a recliner assembly 10 is provided that may be incorporated into a vehicle seat assembly 18 having a seatback 22 and a seat bottom 24. The seatback 22 and seat bottom 24 may include a seatback frame 26 and a seat bottom frame 28 respectively. The seat assembly 18 may be positioned in a vehicle 20, as shown in FIG. 1. The recliner assembly 10 may include a first recliner mechanism 12, a second recliner mechanism 13, a cross member 14, and a hand lever 16 (or release lever).

Figure 5:
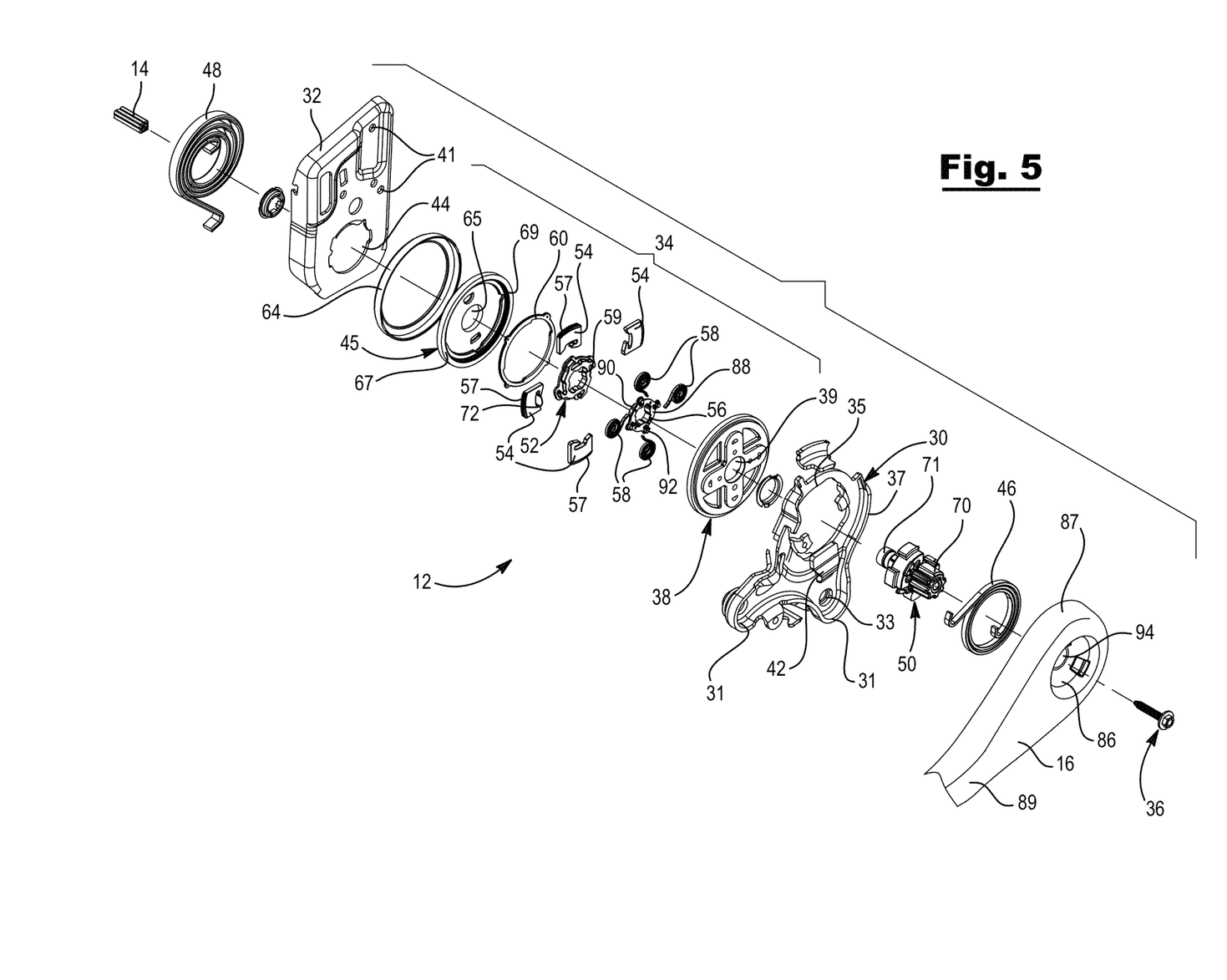
FIG. 5 is an exploded view of a portion of the recliner assembly of FIG. 1.

The first and second recliner mechanisms 12, 13 may be operable in a locked state preventing relative rotation between the seatback 22 and the seat bottom 24 and an unlocked state permitting relative rotation between the seatback 22 and seat bottom 24 among an upright position (FIG. 1), a rearward reclined position (FIG. 2) and a forward dump position (not shown). As shown in FIG. 5, the first recliner mechanism 12 may include a first bracket 30, a second bracket 32, a recliner heart (or locking mechanism) 34, an outer coil spring 46, an inner coil spring 48, and a hub 50.

Figure 4:
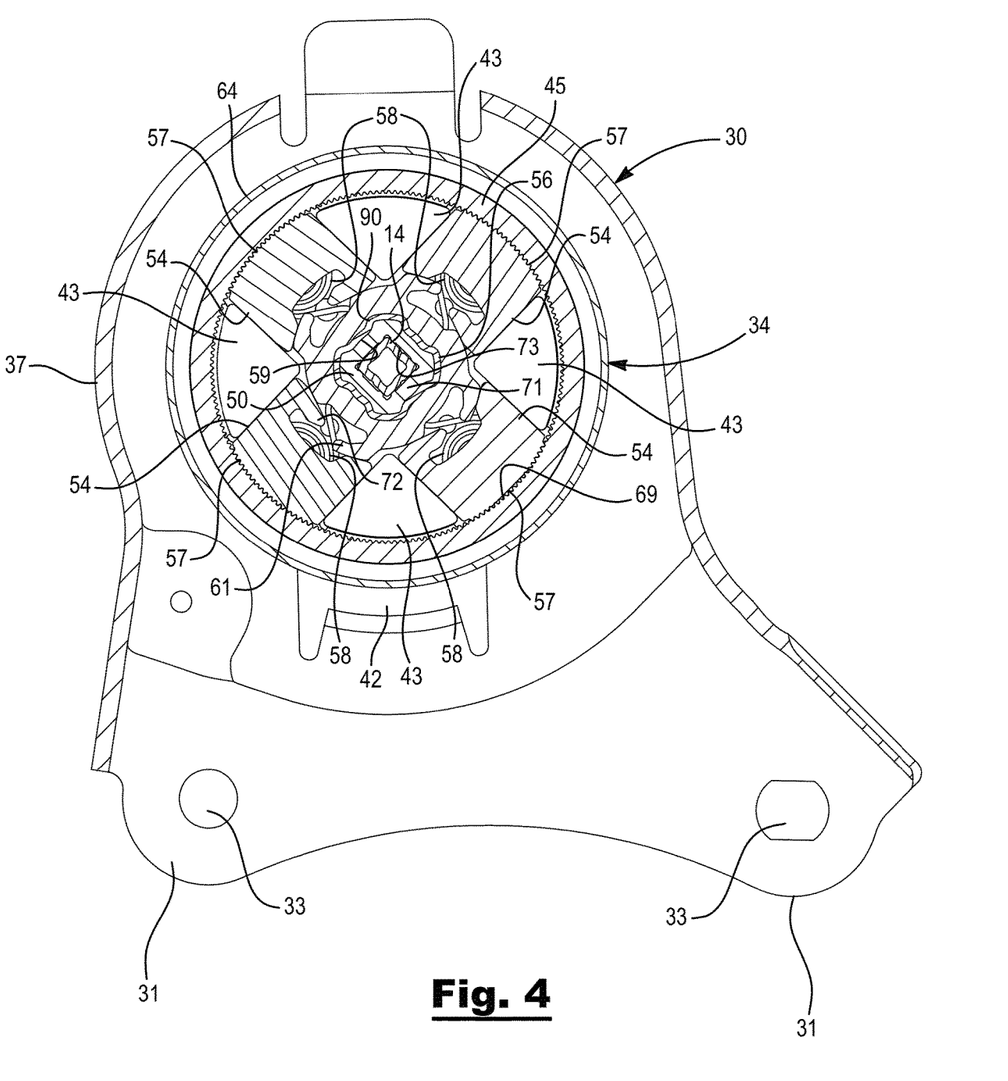
FIG. 4 is a cross-sectional view of a recliner mechanism of the recliner assembly of FIG. 1 in a locked state.

As shown in FIGS. 4 and 5, the first bracket 30 may include a generally round main body 37 and a pair of mounting lobes 31 that extend outward from the main body 37. The main body 37 may include a central aperture 35 and a tab 42. The mounting lobes 31 may include a plurality of apertures 33 through which fasteners (not shown) may extend to securely attach the first bracket 30 to the seat bottom frame 28 of the seat assembly 18.

As shown in FIG. 5, the second bracket 32 may be generally rectangular and may include a plurality of apertures 41, and a central aperture 44 through which the cross member 14 extends. Fasteners (not shown) may extend through the plurality of apertures 41 to securely attach the second bracket 32 to the seatback frame 26 of the seat assembly 18.

With reference to FIG. 5, the recliner heart 34 may be mounted to the first and second brackets 30, 32 and may include a guide plate 38, a ratchet plate 45, a cam 52, a plurality of pawls 54, a connector disk 56, a plurality of coil springs 58, a control ring 60, and an encapsulation ring 64. The recliner heart 34 may be operable to lock the first recliner mechanism 12, thus preventing relative rotation between the seatback 22 and the seat bottom 24, and to also unlock the first recliner mechanism 12, thus permitting relative rotation between the seatback 22 and seat bottom 24.

Figure 6:
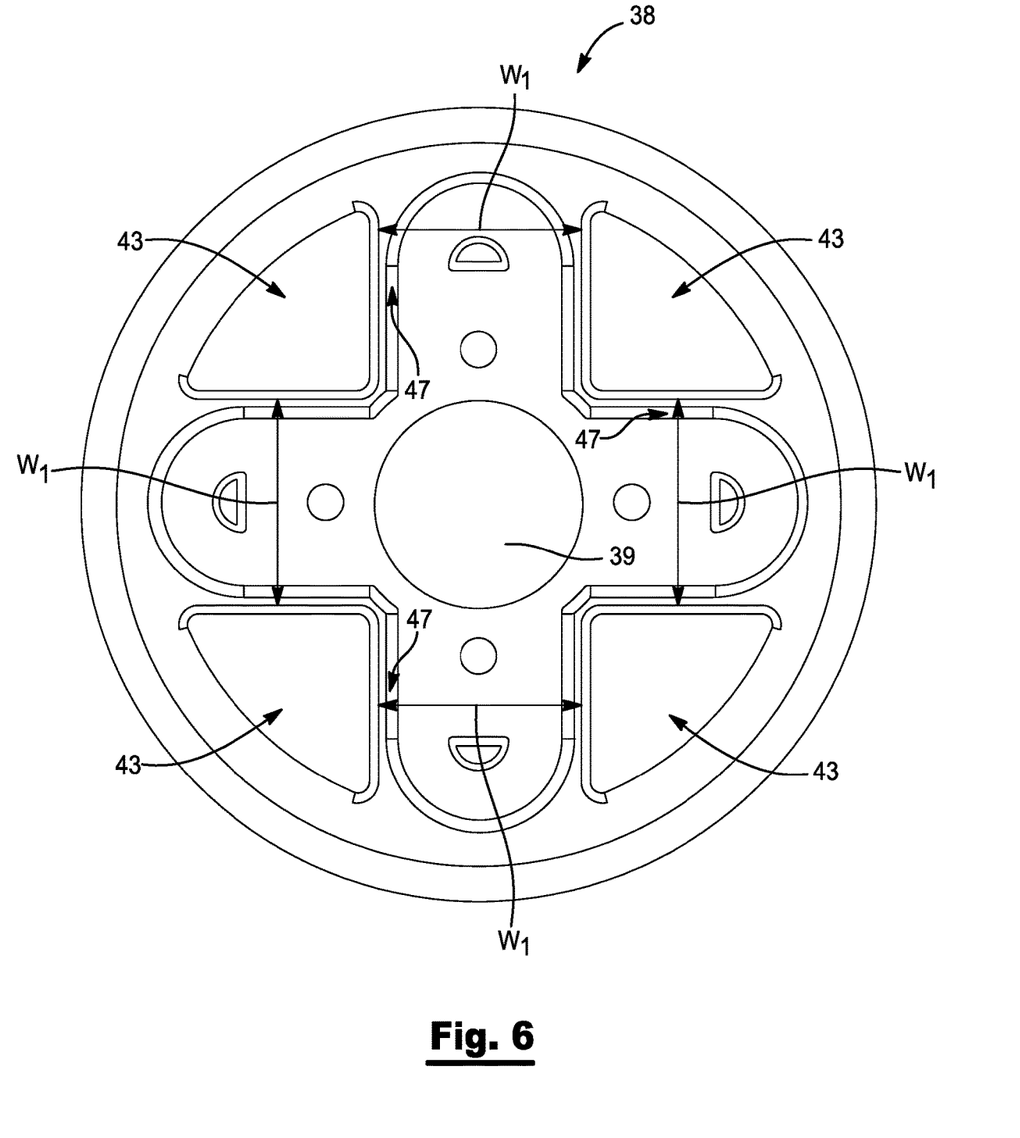
FIG. 6 is a back view of a guide plate of the recliner mechanism.

The guide plate 38 may be mounted to the first bracket 30. With references to FIGS. 4-8, the guide plate 38 may be a generally round, flat disk with a central aperture 39 (FIGS. 5 and 6), a plurality of bosses 43 (FIGS. 4 and 6-8) and first recesses 47 (FIG. 6). Each first recess 47 is disposed between two of the plurality of bosses 43 (FIG. 6) and includes a width W1 (FIG. 6).

The ratchet plate 45 may be a generally round, flat disk and may include a central aperture 65 and a cylindrical recess 67 (FIG. 5). The cylindrical recess 67 may include a plurality of teeth 69 (FIG. 4) disposed on an inner diameter defining the cylindrical recess 67. The second bracket 32 may be welded and/or otherwise suitably fixed to the seatback 22 and the ratchet plate 45 to attach the ratchet plate 45 to the seatback 22. The ratchet plate 45 may be mounted to the guide plate 38 with the cylindrical recess 67 disposed substantially concentric with outer radii of the bosses 43. The encapsulation ring 64 has a U-shaped cross-section and may be disposed generally around the peripheries of the ratchet plate 45 and the guide plate 38 to rotatably couple the ratchet plate 45 to the guide plate 38.

The plurality of pawls 54 may be radially disposed around the central aperture 39 on the guide plate 38 and may be slidably mounted within the first recesses 47 of the guide plate 38 (FIG. 4). An edge of each pawl 54 may include a plurality of teeth 57 adapted for meshing engagement with the teeth 69 of the ratchet plate 45. Each pawl 54 may also include a latch 72 at an end opposite the teeth 57.

The cam 52 may be a generally round disk having an aperture 59 and a plurality of radial latch protrusions 61 arranged around the aperture 59. The cam 52 is rotatable relative to the pawls 54 and the ratchet plate 45 such that the latch protrusions 61 can selectively engage the latches 72 of the pawls 54 to move the pawls 54 out of engagement with the teeth 69 of the ratchet plate 45 (i.e., into the unlocked state).

The connector disk 56 is engaged with the cam 52 and the hub 50. The connector disk 56 may include a disk portion 88

(FIG. 5) and an extrusion 90 (FIGS. 4 and 5) extending perpendicularly from the disk portion 88. The disk portion 88 may have a plurality of flanges 92 extending therefrom. Each flange 92 is engaged with a corresponding one of the coil springs 58 disposed in a second recess 93. Because each flange 92 is engaged to the corresponding spring 58, the connector disk 56 rotationally biases the cam 52 in a manner that causes the latch protrusions 61 to force the pawls 54 radially outwardly into the locked state, whereby the teeth 57 of the pawls 54 engage the teeth 69 of the ratchet plate 45.

The extrusion 90 of the connector disk 56 is engaged with the hub 50 and the cam 52 such that rotation of the hub 50 (which is caused by rotation of the hand lever 16) causes rotation of the cam 52 to move the pawls 54 radially into and out of engagement with the teeth 69 of the ratchet plate 45.

The outer coil spring 46 may exert a torsional force that biases the first recliner mechanism 12 toward a locked state. The outer coil spring 46 may wrap around the hub 50 and engage the first bracket 30 and the hand lever 16. The inner coil spring 48 may extend around the cross member 14 and may engage the first and second brackets 30, 32 to rotationally bias the seatback 22 toward the upright position relative to the seat bottom 24.

The hub 50 may extend through the length of the recliner heart 34 and may include a first end 70 and a second end 71. The first end 70 may engage the hand lever 16 such that the hub 50 and the hand lever 16 are rotationally fixed to each other. A fastener 36 (e.g., a screw; shown in FIGS. 2, 3 and 5) may extend through the hand lever 16 and threadably engage the first end 70 of the hub 50. The second end 71 may include an aperture 73 (FIG. 4) that receives and end of the cross member 14. The cross-sectional shape of the aperture 73 generally corresponds to the cross-sectional shape of the cross member 14 such that the cross member 14 and the hub 50 are rotationally fixed relative to each other. To enable the seatback 22 to pivot relative to the seat bottom 24, a user may pivot the hand lever 16 in a clockwise direction (relative to the view shown in FIG. 4) thus rotating the hub 50 (and consequently the cross member 14). Accordingly, clockwise rotation of the cross member 14 causes the cam 52 to similarly rotate in a clockwise direction relative to the plurality of pawls 54, overcoming a counterclockwise rotational bias of the outer coil spring 46.

The structure and function of the second recliner mechanism 13 may be similar or identical to that of the first recliner mechanism 12 and, therefore, will not be described again in detail.

The cross member 14 may be a generally rectangular (e.g., square) profile and may extend in a cross-vehicle direction. The cross member 14 may connect the first recliner mechanism 12 to the second recliner mechanism 13, and may transmit rotational motion of the first recliner mechanism 12 to the second recliner mechanism 13 to move the second recliner mechanism 13 between the locked and unlocked states simultaneously with motion of the first recliner mechanism 12 between the locked and unlocked states. That is, the cross member 14 transmits torque from the hand lever 16 to the second recliner mechanism 13.

As shown in FIG. 3, the hand lever 16 may include a hub portion 87 and a handle portion 89. The hub portion 87 may include a recess 86. The recess 86 may include an aperture 94 (FIG. 5) through which the fastener 36 extends. The handle portion 89 may extend outward from the hub portion 87 and may be shaped to provide a comfortable gripping surface that a user can grip to actuate the hand lever 16. The hand lever 16 may be securely attached to the first end 70 of the hub 50, so that a rotational movement of the hand lever 16 causes the hub 50 (and consequently the cross member 14) to rotate. This rotational movement may function to lock and unlock the seat recliner mechanisms 12, 13 to selectively prevent and allow rotational motion of the seatback 22 relative to the seat bottom 24.

Figure 7:
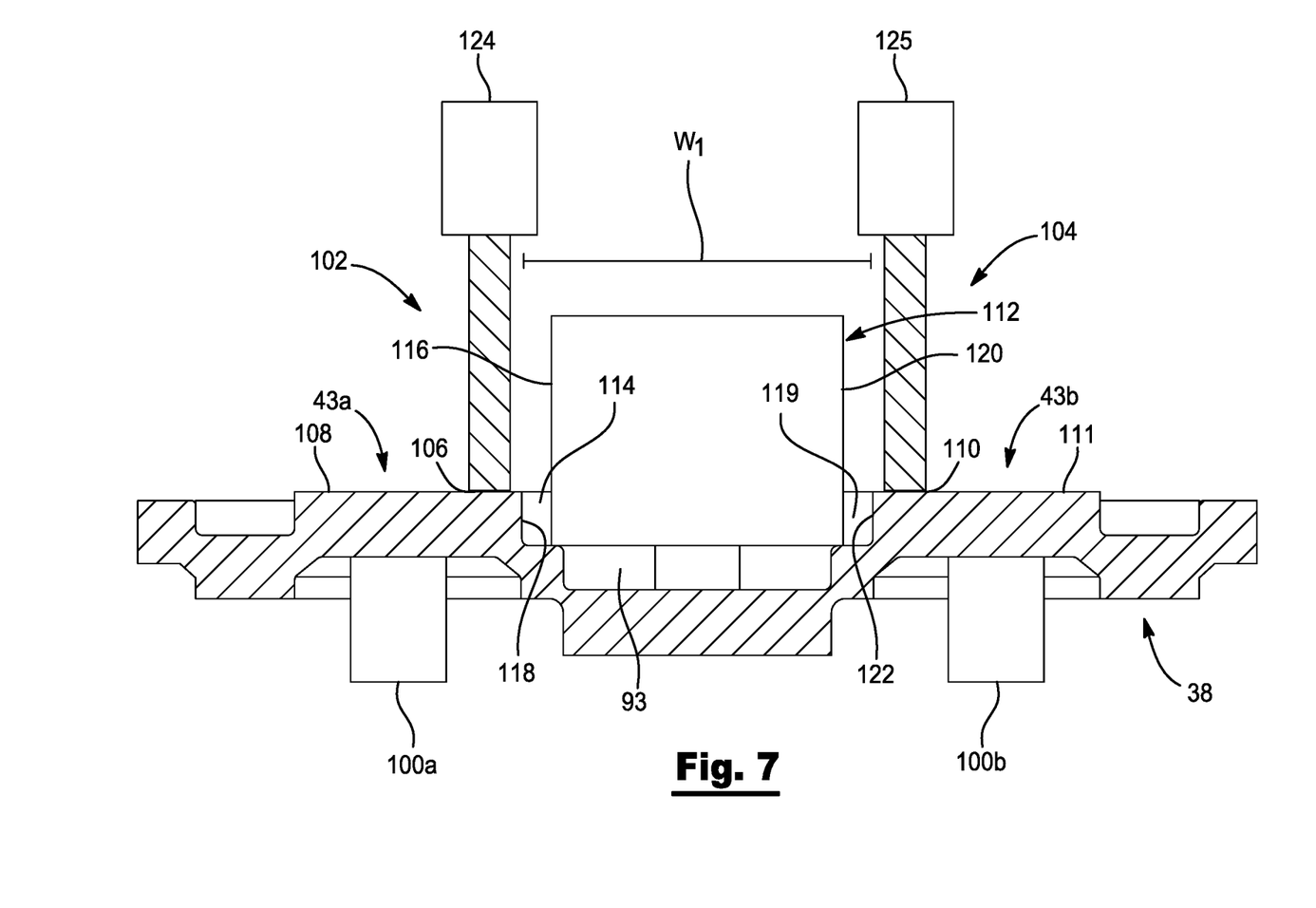
FIG. 7 is a cross-sectional view of the guide plate pre-stamping.
Figure 8:
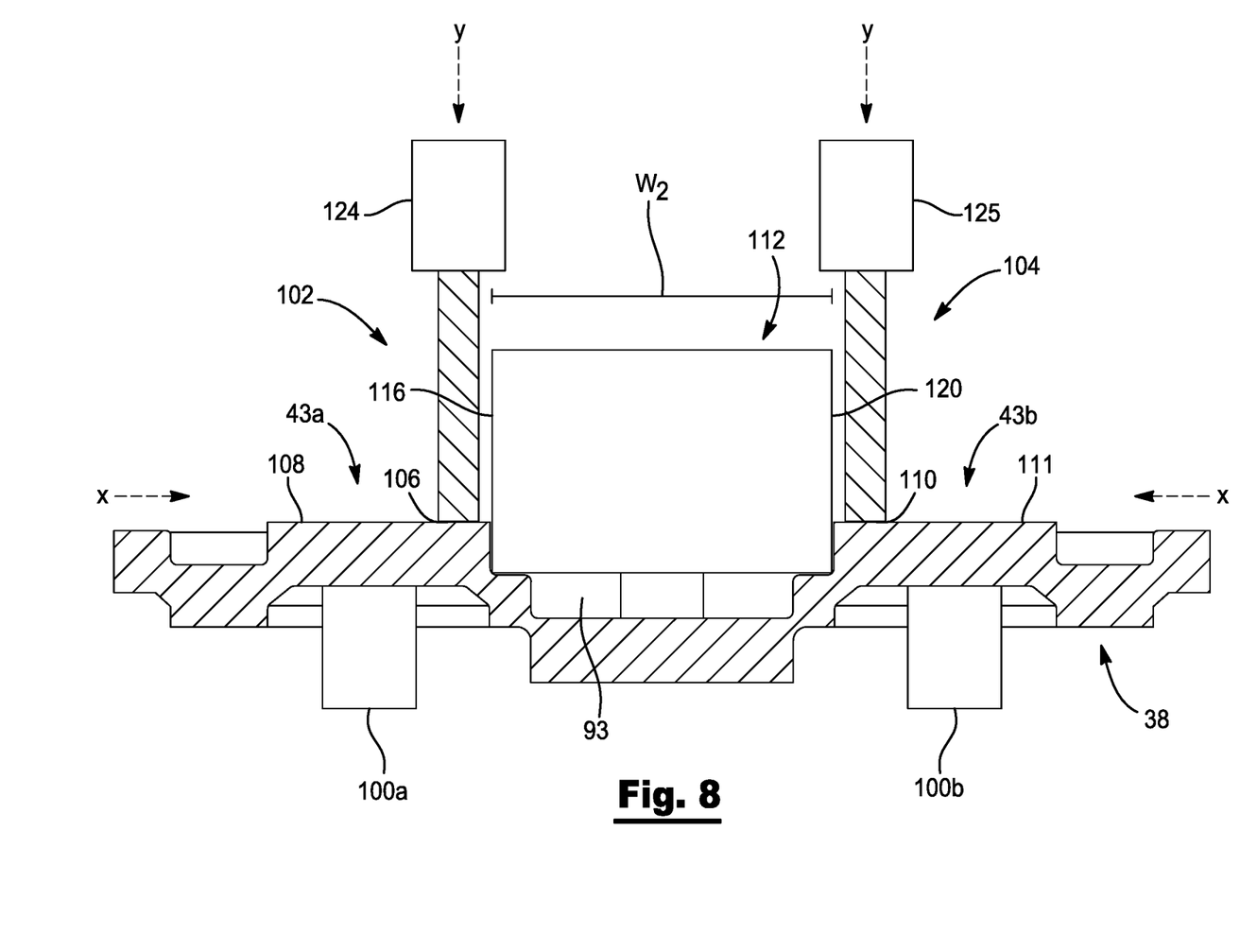
FIG. 8 is a cross-sectional view the guide plate post-stamping.

With continued reference to FIGS. 6-8, a method for manufacturing the guide plate 38 of the recliner heart 34 will now be described in detail. The guide plate 38 can be casted or machined to relatively loose tolerance. Thereafter, the distance between the bosses 43 can be adjusted to reduce unwanted movement between it and other parts of the recliner heart 34. As shown in FIGS. 7 and 8, the guide plate 38 of the recliner heart 34 is disposed on support members 100a, 100b during the adjustment operation such that one boss 43a is supported by the support member 100a and another boss 43b is supported by the support member 100b.

As shown in FIGS. 7 and 8, a first rectangular-shaped impression block 102 is disposed on the one boss 43a at or near an end thereof and a second rectangular-shaped impression block 104 is disposed on the another boss 43b at or near an end thereof. The first impression block 102 is made of a metallic material (e.g., steel) and has a flat end 106 that contacts a surface 108 of the one boss 43a. Similarly, the second impression block 104 is made of a metallic material (e.g., steel) and has a flat end 110 that contacts a surface 111 of the another boss 43b. In some configurations, the ends of 106, 110 of the blocks 102, 104, respectively, may be another shape (e.g., curved or tapered).

A third rectangular-shaped sizing block 112 may be disposed in one of the first recesses 47 (between the blocks 102, 104). In this way, a gap or space 114 is formed between an end 116 of the third sizing block 112 and a wall 118 of the one boss 43a and a gap or space 119 is formed between another end 120 of the third sizing block 112 and a wall 122 of the another boss 43b.

As shown in FIG. 8, a downward force (i.e., in direction Y) is applied on the first impression block 102 via a press 124, for example, such that the first impression block 102 moves material from the one boss 43a inwardly (i.e., in the X-direction) and into the gap 114. Similarly, a downward force (i.e., in direction Y) is applied on the second impression block 104 via a press 125, for example, such that the second impression block 104 moves material from the boss 43b inwardly (i.e., in the X-direction) and into the gap 119. In this way, the width W1 of the one of the first recesses 47 is reduced to width W2. It is understood that the press 124 may apply a force on the block 102 separately or simultaneously to the press 125 applying a force on the block 104. Reducing the width of the first recesses 47 as described above reduces movement of the pawls 54 within the first recesses 47 when the recliner heart 34 locks the first and second recliner mechanisms 12, 13, which, in turn, restricts movement of the seatback 22 relative to the seat bottom 24.

One benefit of the method for manufacturing a recliner heart as described above is the reduction in cost from not having to grind components of the recliner heart to meet specified tolerances. Another benefit of the method for manufacturing a recliner heart as described above is the speed in which the guide plate of the recliner heart may be manufactured (i.e., width of the recesses are sized). The sizing block can also be adjusted as necessary to account for part or material variances within the recliner heart. It should be understood that the method described above can also be used for guide plates for other configurations of recliner hearts/recliner mechanisms that may vary in structure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for manufacturing a recliner heart comprising:
   providing a guide plate of the recliner heart, the guide plate including a first boss and a second boss, wherein the first and second bosses cooperate to define a first recess therebetween, and wherein the first recess slidably receives a pawl of the recliner heart when the recliner heart is fully assembled;
   supporting a first side of the guide plate of the recliner heart with a first support member;
   positioning a first block onto the first boss on a second side of the guide plate opposite the first support member;
   positioning a second block onto the second boss on the second side of the guide plate;
   positioning a third block in the first recess of the guide plate such that a gap is formed between the third block and one of the first and second bosses;
   pressing the first and second blocks against the first and second bosses such that material of the guide plate moves into the gap to reduce a distance between the first and second bosses;
   removing the third block from the first recess after the distance between the first and second bosses has been reduced; and
   positioning the pawl within the first recess after removing the third block from the first recess.

2. The method of claim 1, wherein a pressing force is applied to the first block via a press.

3. The method of claim 2, further comprising supporting the second boss opposite the second block with a second support member.

4. The method of claim 3, wherein the third block is positioned between the first and second blocks.

5. The method of claim 4, wherein when the first and second blocks are pressed against the first and second bosses, material of the first boss moves into the gap and material of the second boss moves into another gap formed between the second boss and the second block.

6. The method of claim 5, wherein the recess has a first width before the forces are applied to the first and second blocks and a second width after the forces are applied to the first and second blocks, and wherein the first width is wider than the third width.

7. The method of claim 6, wherein a pressing force is applied to the second block via a second press.

* * * * *

UNITED STATES PATENT AND TRADEMARK OFFICE
CERTIFICATE OF CORRECTION

PATENT NO. : 11,124,093 B2
APPLICATION NO. : 16/524325
DATED : September 21, 2021
INVENTOR(S) : Ralph L. Schmitz et al.

It is certified that error appears in the above-identified patent and that said Letters Patent is hereby corrected as shown below:

In the Claims

Column 8, Line 21: Claim 5, delete "second block" and insert --third block--

Column 8, Line 26: Claim 6, delete "third" and insert --second--

Signed and Sealed this
Ninth Day of August, 2022

Katherine Kelly Vidal
*Director of the United States Patent and Trademark Office*